Nov. 17, 1936.    G. C. CONN    2,061,061
MEASURING DISPENSER
Filed Aug. 1, 1935    3 Sheets-Sheet 1
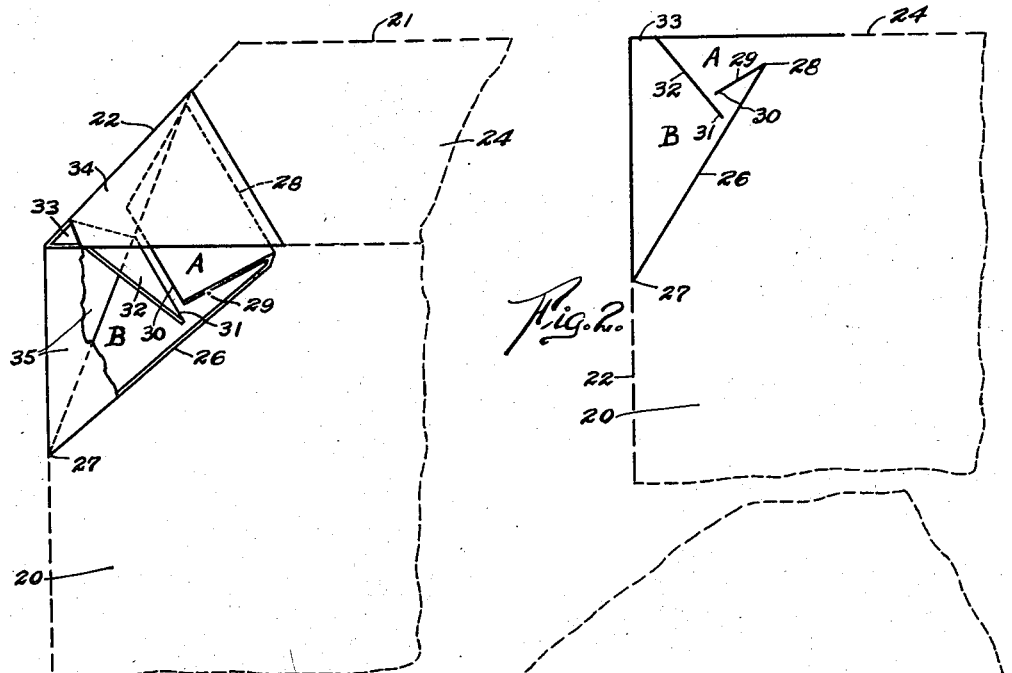
Fig. 1.
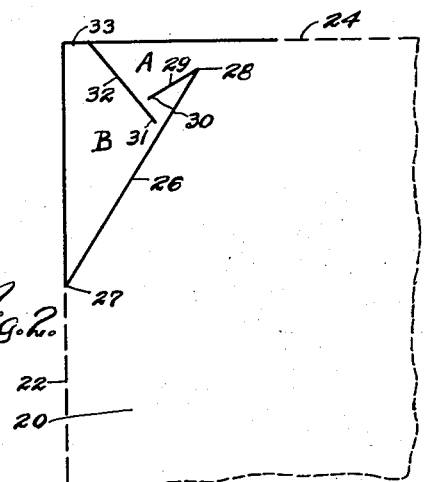
Fig. 2.
Fig. 3.
Fig. 4.
Fig. 5.
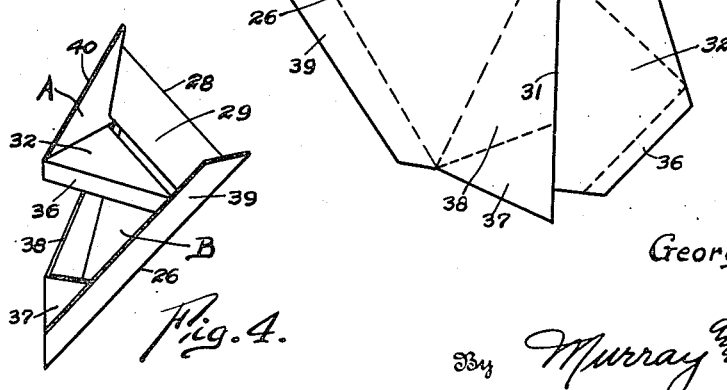
Inventor
George C. Conn
By Murray and Zugelter
Attorneys.

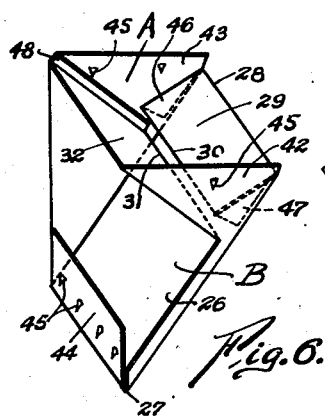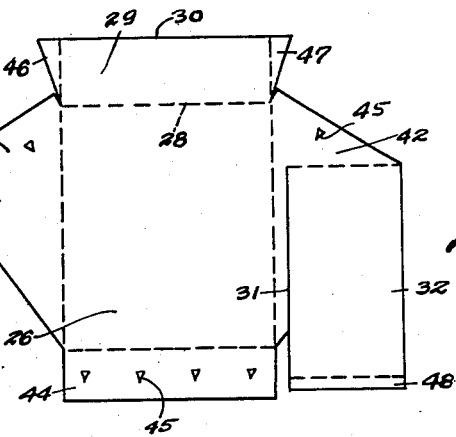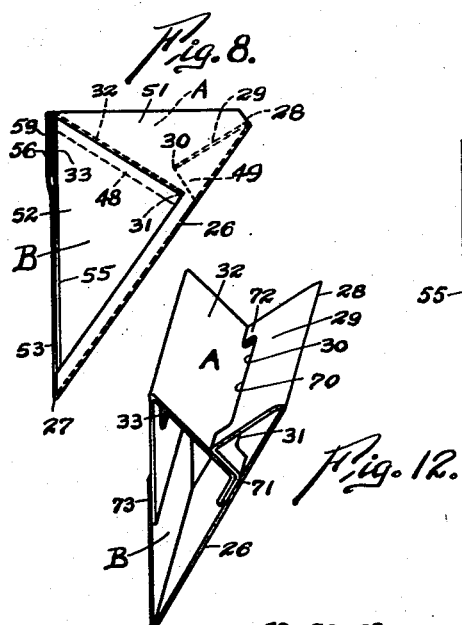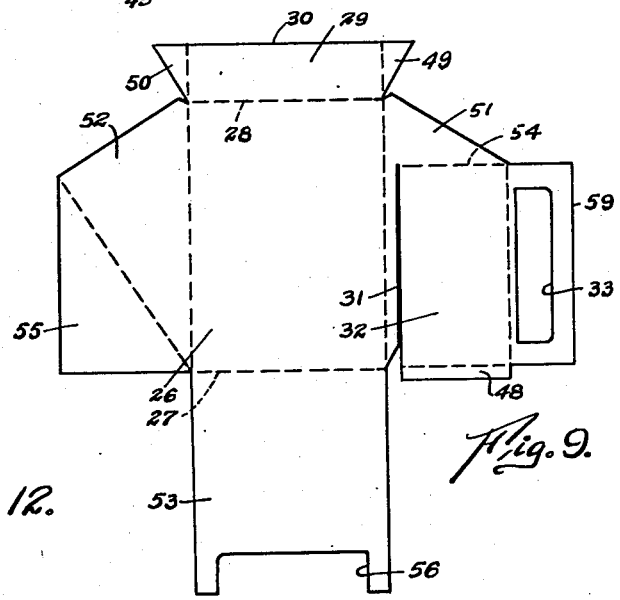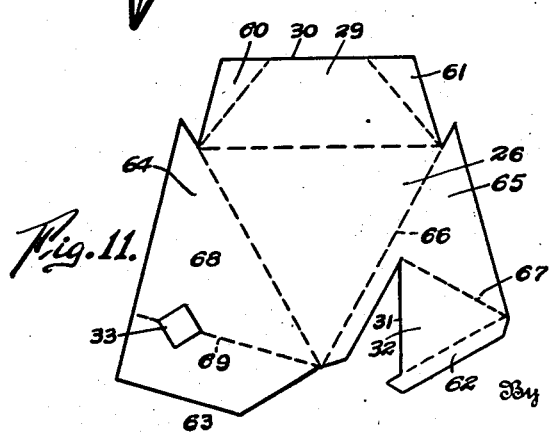

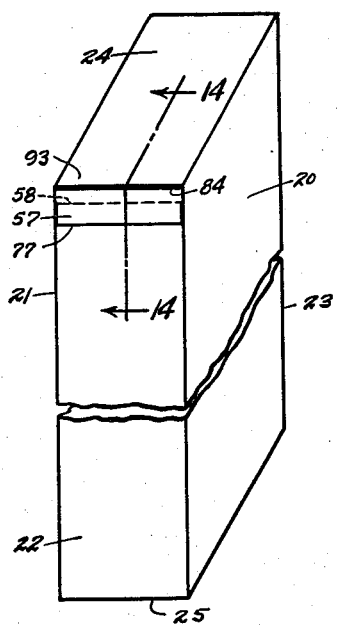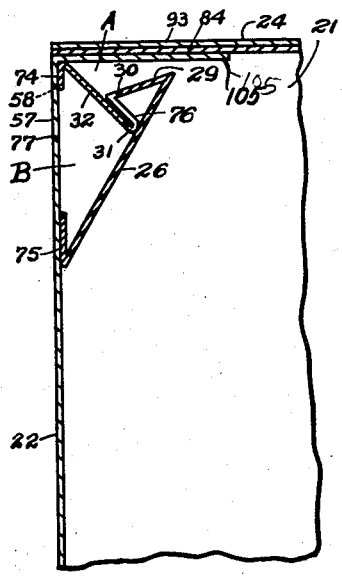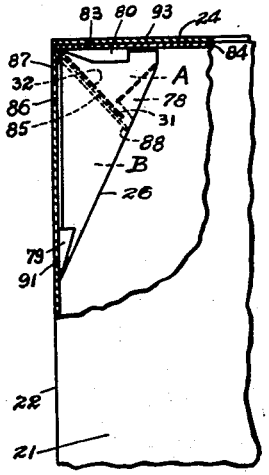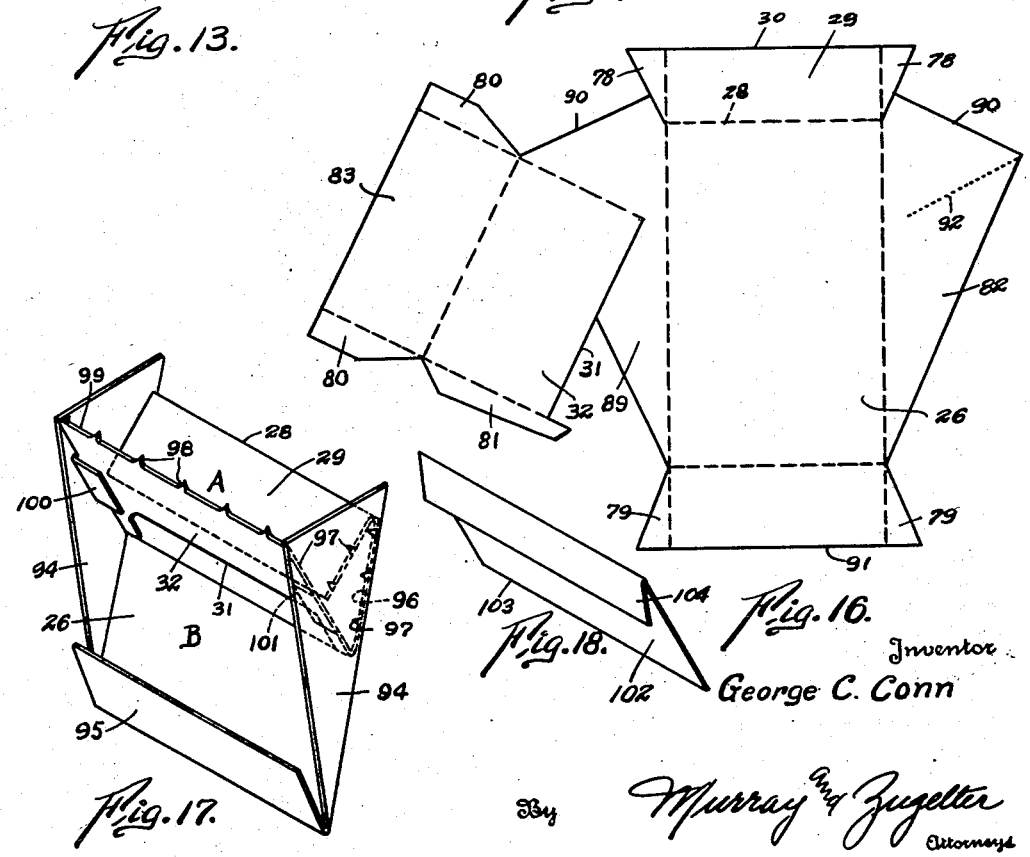

Patented Nov. 17, 1936

2,061,061

UNITED STATES PATENT OFFICE 2,061,061

MEASURING DISPENSER

George C. Conn, Cincinnati, Ohio

Application August 1, 1935, Serial No. 34,234

14 Claims. (Cl. 221—98)

This invention relates to a measuring dispenser for various kinds of granular or comminuted materials such as sugar, ground coffee and similar food products, cleansers of various kinds, powders, and the like.

An object of the invention is to provide a simple, inexpensive, and commercially practical means for successively dispensing measured quantities of any material that will flow from a container in the manner of those exemplary materials above listed.

Another object of the invention is to provide a measuring dispenser of the above stated character, which performs its intended purpose accurately whether the container portion thereof is full or only partly full of the material to be dispensed.

A further object of the invention is to provide a device of the character stated, which may easily be formed either of a single sheet of material, or a plurality of complemental sheets, and applied to a container in a practical manner.

These and other objects are attained by the means described herein and disclosed in the accompanying drawings, in which:

Fig. 1 is a fragmental perspective view of a box having incorporated therein a corner type of measuring device.

Fig. 2 is a side elevational fragmental view showing diagrammatically the relative positions of the parts in the device disclosed by Fig. 1.

Fig. 3 is a view similar to Fig. 2, showing the device tilted for effecting a measurement and discharge of material.

Fig. 4 is a perspective view of a modification of the Fig. 1 device, made of a single piece of sheet material.

Fig. 5 is a pattern for making the Fig. 4 device.

Fig. 6 is a perspective view of a modified form of measuring dispenser, constructed of sheet metal and embodying the same principle of operation as the Fig. 1 device, but being adapted for application to a container by spanning two opposed walls thereof.

Fig. 7 is a pattern for making the Fig. 6 device.

Fig. 8 is a side elevational view of another modification, following the general construction of the Fig. 6 device, but adapted to be formed of material less rigid than metal, for example, cardboard or stiff paper.

Fig. 9 is a pattern for making the Fig. 8 device.

Fig. 10 is a perspective view showing a modified form of the corner type of device disclosed by Fig. 4.

Fig. 11 is a pattern for making the Fig. 10 device.

Fig. 12 is a perspective view showing a modification of the Fig. 8 device.

Fig. 13 is a fragmental perspective view of a container such as may be provided with measuring dispensers of the various types disclosed herein.

Fig. 14 is a fragmental cross-sectional view taken on line 14—14 of Fig. 13, showing the application of a device quite similar to the device of Fig. 12.

Fig. 15 is a front view of a container broken away to show a construction wherein a side flap of the container forms a closure or seal for a measuring dispenser further modified.

Fig. 16 is a view of a pattern for making the Fig. 15 measuring dispenser.

Fig. 17 is a perspective view of a metal and cardboard measuring dispenser, adapted to be sealed or closed normally by a shiftable gate, which gate is illustrated by Fig. 18.

Throughout the following description, the type of measuring dispenser shown in Figs. 1, 4 and 10, will be referred to as the "corner" type, because it is applied to a box or container within the corner or apex formed by one front wall, one side wall, and a top wall of the container, and discharges at the corner or meeting edges of the container walls. The type of device exemplified by Figs. 6, 8, 12, 14, 15 and 17 will be referred to hereinafter as the "wall" type, as it is applied primarily to a flat wall and discharges through a slot or opening formed in the plane of a wall of the container. For the purpose of convenience of description, the opposed walls 20 and 21 of each container illustrated, will be considered the front and rear walls, respectively, and 22 and 23 will be considered the opposed side walls. The top and bottom walls are indicated by the characters 24 and 25, respectively. It is to be understood that the wall type of device may be applied to any wall of the container, and is not necessarily limited to application to a side wall as illustrated and described. The devices of the invention may be constructed of any suitable material, and may be formed by means of cutting and bending, molding, or assembling operations.

In general, the device of the invention, in all its forms, comprises a main wall 26 which is inclined from a vertical wall 22 of the container toward the top 24 thereof. The lower portion of the main wall is secured to, or otherwise makes a tight joint with, the side wall of the container, so that the interior of the measuring dispenser is completely separated from the interior of the container at such point, as indicated by the character 27. The upper edge 28 of the main wall is disposed in spaced parallelism with the top of the container, at a spacing of approximately one-quarter (¼) inch, under ordinary circumstances. Extending inwardly of the measuring dispenser, at the upper edge 28 of the main wall, there is provided an overflow limit lip or flange 29, which lip or flange is inclined at an obtuse angle to the main wall, and meets said main wall preferably with a sharp joint or meeting line, this being indicated at 28.

The terminal edge 30 of the overflow limit lip substantially overhangs the lower terminal edge 31 of a partition member 32 which is inclined downwardly from a location at or adjacent to the top of the container, to a location at which the lower terminal edge 31 thereof extends beneath the terminal edge 30 of the overflow limit lip when the container is standing in upright position upon its bottom wall. The terminal edge 31 of the partition member is parallel to the plane of the main wall 26, and is spaced uniformly from said wall with a spacing approximately equal to the spacing between the terminal edge 30 of the overflow limit lip and the body of partition member 32. The angle of inclination of the partition member, the main wall, and the overflow limit lip is sufficient to provide for gravitation of the container contents from the chamber A above the partition member 32 to the chamber B below said member, assuming an upright normal position of the container in which the measuring dispenser is mounted. The upper and lower chambers just mentioned will be identified as chambers A and B, respectively, throughout the drawings and description. The chamber A has direct communication with the interior of the container by way of the space between the upper edge 28 of the main wall of the measuring dispenser and the top wall 24 of the container. This chamber A performs the function of measuring the quantity of material that will be dispensed, as is evident from the disclosure of Fig. 3. The measuring operation takes place when the container is tilted to the Fig. 3 position, and when the container is subsequently righted, the material held by the chamber A gravitates into the chamber B through the space between the overflow limit lip 29 and the partition 32. Upon again tilting the container to the Fig. 3 position, the material that entered the chamber B from chamber A when the container was righted, may leave the chamber B through a suitable spout or discharge opening 33 (see Fig. 1). At this point, it may be stated that the spout or discharge opening may be formed in a vertical wall of the container, as well as in the top 24, as illustrated in Fig. 1. For example, the spout or discharge opening may be located as indicated at 33 of Figs. 10 and 12.

All of the foregoing applies to each and every form of the device illustrated in the accompanying drawings, wherefore the elements common to said devices bear the same reference characters in all the views of the drawings. It may be observed that Fig. 2 and Fig. 3 views disclose the proper relationship of the various elements constituting the measuring dispenser, whether such measuring dispenser be of the corner type of Figs. 1, 4, and 10, or of the wall type disclosed in the other figures of the drawings.

Referring specifically to Fig. 1, it may be stated that the corner device disclosed therein is constructed of metal or other rigid material which is sufficiently strong to hold its parts in the desired cooperative relationship without the assistance of glue tabs or other means connecting the parts. In the Fig. 1 device, the partition member 32 may be integral with a top plate 34 which may be glued, soldered, or otherwise fixed within the container corner. The top plate 34 may in turn be fixed to the side walls 35 which support also the main wall 26 and the overflow limit lip 29. As stated above, the discharge port 33 of the Fig. 1 device may be formed in the convergent walls 35 instead of in the top wall 34.

Figs. 4 and 5 disclose, respectively, a corner type measuring dispenser and a pattern for making it, this type of device being adapted for formation from paper, cardboard, or other inherently weak sheet material. In this form of device, there are provided a series of securing flaps or tabs 36, 37, 38, and 39 whereby the main wall 26, and the overflow limit lip 29 are all maintained in the proper cooperative relationship indicated generally in Figs. 2 and 3. The surfaces of the tabs or flaps 36, 37, 38, 39 and 40 may be coated with glue or otherwise treated to provide for adherence of the measuring device to the side and front walls of a container in substantially the relationship disclosed in Fig. 1. The device of Figs. 4 and 5 may also be constructed of metal, if desired. When constructed of less rigid material, it may be necessary to fasten the overflow limit lip 29 to the securing tabs 39 and 40.

In all the drawing views showing patterns for construction of the various forms of measuring dispenser, the broken lines indicate score lines while the full lines indicate cuts into the material.

From the disclosure of Fig. 3, it will be observed that the overhanging relationship of the terminal edge 30 over the edge 31 of the overflow limit lip, results in a building up of granular material along a slightly inclined line 41 which is so limited in its inclination that the material from chamber A can not overflow into chamber B while the container is held in the tilted position. Moreover, no part of the material in chamber A will be inflowing into container B until the container is righted sufficiently to cut off the supply of material to chamber A along the line 28. It must therefore be evident that the measurement of the quantity of material in chamber A can not be altered or rendered inaccurate by reason of a fast or a slow tilting and righting of the container. The accuracy is maintained by reason of the overhanging of the lip 29 relative to the terminal edge 31 of the partition 32, and this relationship insures against premature discharge of material from chamber A to chamber B during righting of the container from the tilted position.

In the modification disclosed by Figs. 6 and 7, Fig. 7 being a pattern for forming the Fig. 6 device, the side walls 42 and 43, and the upwardly turned mounting tab or flange 44, are provided with a series of sharpened outwardly extending prongs 45 which may be fastened into the material of the container which embodies the device. In this modification, the measuring and dispensing device is constructed of a single sheet of thin metal, blanked out as disclosed in Fig. 7, and bent into the form disclosed in Fig. 6. By forcing the Fig. 6 device into the container with the prongs of flange 44 engaging in the material of a side wall 22, while the prongs of the walls 42 and 43 clinch the material of the rear and front walls 20 and 21, the device is securely held in position and prevented from disassociation with the container walls by closing the top flaps of the container down upon the upper edges of the walls 42 and 43 of the dispensing device. The various elements or walls 26, 29, and 32 bear the same relationship to one another as is illustrated in Fig. 2. When the Fig. 6 device is constructed of cardboard, stiff paper, or such material as does not possess the rigidity of metal, the parts are held in the Fig. 6 relationship by the application of adhesive or other securing means to the various flaps and tabs 46, 47, and 48. The device thus constructed of paper, cardboard, or the like, may be held in position within the container by means of adhesive material or suitable clinching or stapling means.

The form of device disclosed by Figs. 8 and 9 will now be described. This form is adapted to be constructed of a blank such as disclosed in Fig. 9, the material of which may be of cardboard or stiff paper, or the like. The broken lines indicate score lines, and the full lines indicate cuts through the material. In this form of the device, the securing tabs 49 and 50 may be glued into position upon the side portions 51 and 52, respectively, after bending to proper position. The front wall piece 53, after bending the member 32 upwardly along the line 54, and bending members 51 and 52 inwardly along their vertical score lines, may be secured to the triangular flap 55 by means of a suitable adhesive or securing means. The notch or cut out 56 will then register with the discharge aperture 33, and the material adjacent to the cut out portion may be fixed to the material which surrounds the aperture 33. The relationship of these parts is disclosed in Fig. 8. The apertures provided by the cut outs 56 and 33 are adapted to register with an opening or displaceable flap in a side wall of the container, such as is indicated by the character 57 of Fig. 13. Such flap may have a hinged connection with the side wall 22 of the container, as indicated at 58, and the flap thereby may form a closure for the container after use. The device of Fig. 8 may be mounted within a container in a manner similar to that disclosed in Figs. 14 or 15 by means of an adhesive or securing means upon the walls 51 and 52, and upon the face of extension 53. The extension 59 which contains the pouring aperture 33, is bent downwardly as disclosed in Fig. 8, in the finished or assembled device.

The device of Fig. 10, made from the pattern of Fig. 11, is a corner device somewhat similar to that of Fig. 4, but adapted for formation from a single sheet of paper or cardboard. The various glue flaps of the Fig. 10 device for maintaining the desired relationship of elements, are indicated by the characters 60, 61, 62, and 63. The glue flaps 60 and 61 are turned inwardly and the overflow limit lip 29 is bent forwardly, so that the glue flaps 60 and 61 may be adhered to the side walls 64 and 65, respectively. Upon bending the wall 65 upwardly about its score line 66, the partition member 32 is bent upwardly along its score line 67, and swung into position for disposing the terminal edge 31 thereof in spaced relationship to the main wall 26. The glue flap 62 thereupon is fastened to the side wall 64 at approximately the location of the reference character 68. Thereafter, the glue flap 63 is bent along its score line 69 and fastened against the wall 65 as shown in Fig. 10.

The device of Fig. 12 is constructed of a single length of paper, cardboard, or metallic ribbon, having the pouring aperture 33 punched therein and another aperture 70 to provide the supporting legs 71 and 72. The aperture 70 furnishes a terminal edge 30 and an overflow limit lip 29, as well as a terminal edge 31 overhung by the edge 30 as previously explained. By means of the Fig. 12 construction, a single ribbon or tape of material provides all the necessary elements 29, 26 and 32 of the measuring dispenser. The ends of the material may be joined together at the location 73, and the outer faces of the flaps forming the joint may be glued or otherwise fixed against a side wall 22 of a container such as is illustrated in Fig. 13. If desired, the lateral edges of the portions 26, 32 and 29 may be provided with glue tabs such as 49 and 50 of the Fig. 9 device, for more rigidly securing the measuring and dispensing device elements in position within the container. A pattern for the Fig. 12 form of device is not disclosed because of the simplicity thereof.

Fig. 14 is a representation of that portion of a container which is set off by section line 14—14 of Fig. 13, showing the application of a device somewhat similar to that of Fig. 12 mounted therein. The device of Fig. 14, however, includes no overlapping joint such as 73 of Fig. 12, the joint being omitted so that separated flaps 74 and 75 are glued or otherwise fixed to the side wall 22 of the container. The Fig. 14 device includes the essential elements of the Fig. 12 modification, namely, the elements indicated by the characters 29, 26 and 32. The terminal edges 30 and 31 bear the same relationship to one another as do those illustrated and described in connection with the device of Fig. 2. The character 76 indicates a leg or brace corresponding to that indicated at 71 of Fig. 12. The displaceable flap 57 of Fig. 13, is shown in operative relationship with the measuring and dispensing device in Fig. 14. The upper score line is indicated at 58, and a deep cut in the side wall 22 nearly but not entirely through the material thereof, is indicated at 77. The user, as will be understood, severs the displaceable flap along the line 77 and lifts it about the hinge or score line 58 in order to dispense the material of the container.

The modified form of device disclosed by Fig. 15 is made from the pattern of Fig. 16. This form of the device is adapted especially for cutting from a flat sheet of cardboard or stiff paper. The device includes the usual essential parts 26, 29 and 32, together with pairs of glue flaps 78, 79 and 80 whereby the device may be maintained in the assembled position of Fig. 15. A securing flap 81 is provided for attachment to the side piece 82, for holding the partition member 32 in proper spaced and angular relationship to the main wall 26. The Fig. 15 device differs from the others in that there is provided the upper horizontal cover or leaf 83 which performs the function of, and acts as a substitute for, the usual inwardly turned flap (such as the flap 105, Fig. 14) of a container side wall. Such usual flaps are indicated at $i^2$ in the patent of Shotwell No. 1,331,590 dated February 24, 1920. In other words, the ordinary side wall flap (105, Fig. 14) of the container, instead of being glued to the intermediate front or rear flap 84 of the container, is inclined downwardly beneath the partition member 32 so as to provide a closure for the opening between the terminal edge 31 of member 32, and the adjacent surface of the main wall 26. The intermediate flap 84, (refer now to Fig. 15), is attached or glued to the cover or leaf 83 of the measuring and dispensing device, instead of to the side wall flap 85 of the container proper. At the junction of the container side wall flap 85 and the side wall 22, the angularity between said parts 85 and 22 approximates the angle between the partition member 32 and the side wall 22 of the container. Below the line of juncture, the side wall 22 of the container is deeply scored or perforated as at 86, to provide a displaceable flap 87 similar to that disclosed in Fig. 13, which flap 87 may be disconnected entirely from the material of the container side wall and removed to withdraw the lower end 88 of the flap from contact with the main wall 26. By thus withdrawing the element 87—85, communication is established between the chambers A and B. After using the container and removing part of the contents through the measuring and dispensing device, the closure means 87—85 may be reinserted for sealing the container at the locations 31 and 86. The provision of the cover or leaf 83 as a substitute for the ordinary flap 85 of the container side wall, and disposition of the flap 85 to the unusual relationship against the lower face of partition member 32, with the innermost edge 88 contacting the main wall 26, constitutes an important feature of the Fig. 15 form of measuring and dispensing device. This construction is especially desirable for use in containers for packaging coffee and like granular material which may lose its strength or aroma unless the box can be resealed after having been opened.

In forming the Fig. 15 device from the Fig. 16 pattern, it is to be noted that the glue flaps 80 are secured to the side portions 82 and 89 along the upper edges 90 thereof, so that the cover or leaf member 83 will be substantially at right angles to the side wall 22 of the container when the device is glued or otherwise secured in place against the walls 22, 20 and 21 of the container. The entire supporting flap 91 may have glue applied thereto for attaching it to the inner face of the side wall 22 (see Fig. 15). The glue flap 81 assumes a position substantially along the dotted line 92 upon the side wall 82, so that the terminal edge 31 of the partition member 32 will be maintained in proper spaced parallelism with the main wall 26. In Figs. 13, 14 and 15, the character 93 indicates the outermost top flap of the ordinary cardboard container, whereas 84 indicates the usual intermediate flap which carries glue on both faces thereof for adhesion to the top flap and ordinarily to the opposed innermost flaps of side walls 22 and 23. In accordance with the Fig. 15 construction, however, the glue upon the innermost face of the intermediate flap connects the intermediate flap to the cover or leaf 83 of the measuring and dispensing device, instead of to the flap 85 of the side wall 22, which latter flap is employed to provide a closure or seal between chambers A and B.

Figs. 17 and 18 disclose a modified form of measuring and dispensing device, which, like the device of Fig. 15, provides for a closure or seal between chambers A and B. In this last form of device, the main wall 26, the side walls 94, and the securing flap 95, are formed of a piece of stiff paper or cardboard blanked out from a flat sheet. The remainder of the measuring device, i. e., that portion which consists of the intermediate wall 32, the overflow limit lip 29, and connecting web 96 for the parts 29 and 32, is punched from a flat sheet of metal, so that the parts 29 and 32 will maintain their proper relationship to one another, as described in connection with Figs. 1 to 3. After formation of the metallic section 29—32—96, it is placed upon the main wall 26 and fixed in position by means of a series of sharpened prongs 97 formed along the side edges of the elements 29, 32 and 96. Similar prongs 98 are provided along the upper edge 99 of the partition wall 32, for either penetrating or extending partly through the material of a container at the location 84 of Fig. 13, i. e., at the junction line formed by the top and a side wall of the container. The prongs 98 preclude the measuring and dispensing device of Fig. 17 from shifting horizontally within the container, while the flap 95, glued or otherwise fastened to the side wall 22 precludes the possibility of such downward shifting of the device as would disassociate the prongs 98 from their seats or depressions in the material of the container. It will be noted that the metallic partition member 32 may be provided at its opposite ends with a pair of inwardly turned ears or guides 100 and 101 to provide a slideway or channel for reception of a closure member 102, illustrated in Fig. 18. The closure member is adapted to be reciprocated toward and from the main wall 26, in abutting relationship with the partition member 32, for closing the aperture between the main wall and the terminal edge 31 of the partition member 32. The inner edge 103 of the closure member 102 abuts the wall 26 to shut off communication between chambers A and B. The handle portion or depending flange 104 of the closure member, provides a closure for an opening in the side wall 22 of the Fig. 13 container, for example, an opening such as would result from entirely removing the displaceable flap 87. When it is unnecessary to provide a closure for such opening in the side wall 22 of the container, the handle or flange portion 104 may be reduced in width so as to provide a narrow finger piece to be grasped for reciprocating the closure plate 102 toward and from the main wall 26, as said plate is guided by the flanges 100 and 101. It may be noted that a closure member operating in substantially the manner of plate 102 could be applied to the Fig. 1 device at a location against the lower face of partition member 32, for closing the space between edge 31 and main wall 26. In such construction, the finger piece would extend through the pouring spout 33 to be actuated exteriorly of the container. A limited reciprocating motion of the closure device, if applied to the Fig. 1 construction, would be accomplished by making the closure plate similar in shape to the partition member 32 but narrower in width.

What is claimed is:

1. A measuring and dispensing device for application to a container, said device comprising an inclined main wall and a partition member inclined to the main wall and having a terminal edge substantially uniformly spaced from the main wall, an upper edge on the main wall, and an overflow limit lip in the form of a wall coextensive in width with the upper edge of the main wall and extended toward the partition member, said overflow limit lip having a free terminal edge spaced from the plane of the partition member.

2. A measuring and dispensing device for application to a container, said device comprising an inclined main wall and a partition member inclined to the main wall and having a terminal edge substantially uniformly spaced from the main wall, an upper edge on the main wall, and an overflow limit lip in the form of a wall coextensive in width with the upper edge of the main wall and extended toward the partition member, said overflow limit lip having a free terminal edge spaced from the plane of the partition member and overhanging the terminal edge of the partition member.

3. A measuring and dispensing device for application to a container, said device comprising an inclined main wall and a partition member inclined to the main wall and having a terminal edge substantially uniformly spaced from the main wall, an upper edge on the main wall, and an overflow limit lip in the form of a wall coextensive in width with the upper edge of the main wall and extended toward the partition member, said overflow limit lip having a free terminal edge spaced from the plane of the partition member and overhanging the terminal edge of the partition member, the angularity of the overflow limit lip to the main wall being substantially less than a right angle.

4. A measuring and dispensing device for application to a container, said device comprising an inclined main wall and a partition member inclined to the main wall and having a terminal edge substantially uniformly spaced from the main wall, an upper edge on the main wall, and an overflow limit lip in the form of a wall coextensive in width with the upper edge of the main wall and extended toward the partition member, said overflow limit lip having a free terminal edge spaced from the plane of the partition member and included in a plane meeting the plane of the main wall at an angle substantially less than a right angle.

5. The combination with a container having a side wall, a pair of opposed walls meeting the side wall, and a top wall, of a measuring and dispensing device comprising a main wall inclined relative to the container side wall, said main wall having a substantially straight upper edge all points of which are spaced substantially equidistant from the top wall of the container, and a lower edge on the main wall abutting the container side wall, a partition member inclined toward an intermediate portion of the main wall and having a terminal edge substantially uniformly spaced from said portion of the main wall, an overflow limit lip in the form of a wall substantially coextensive in width with the upper edge of the main wall and extending from said upper edge toward the partition member, said overflow limit lip having a free terminal edge spaced from the plane of the partition member.

6. The combination with a container having a side wall, a pair of opposed walls meeting the side wall, and a top wall, of a measuring and dispensing device comprising a main wall inclined relative to the container side wall, said main wall having a substantially straight upper edge all points of which are spaced substantially equidistant from the top wall of the container, and a lower edge on the main wall abutting the container side wall, a partition member inclined toward an intermediate portion of the main wall and having a terminal edge substantially uniformly spaced from said portion of the main wall, an overflow limit lip in the form of a wall substantially coextensive in width with the upper edge of the main wall and extending from said upper edge toward the partition member, said overflow limit lip having a free terminal edge spaced from the plane of the partition member a distance approximating the width of space between the container top and the upper edge of the main wall.

7. The combination with a container having a side wall, a pair of opposed walls meeting the side wall, and a top wall, of a measuring and dispensing device comprising a main wall inclined relative to the container side wall, said main wall having a substantially straight upper edge all points of which are spaced substantially equidistant from the top wall of the container, and a lower edge on the main wall abutting the container side wall, a partition member inclined toward an intermediate portion of the main wall and having a terminal edge substantially uniformly spaced from said portion of the main wall, an overflow limit lip in the form of a wall substantially coextensive in width with the upper edge of the main wall and extending from said upper edge toward the partition member, said overflow limit lip having a free terminal edge spaced from the plane of the partition member and overhanging the terminal edge of the partition member.

8. The combination with a container having a side wall, a pair of opposed walls meeting the side wall, and a top wall, of a measuring and dispensing device comprising a main wall inclined relative to the container side wall, said main wall having a substantially straight upper edge all points of which are spaced substantially equidistant from the top wall of the container, and a lower edge on the main wall abutting the container side wall, a partition member inclined toward an intermediate portion of the main wall and having a terminal edge substantially uniformly spaced from said portion of the main wall, an overflow limit lip in the form of a wall substantially coextensive in width with the upper edge of the main wall and extending from said upper edge toward the partition member, said overflow limit lip having a free terminal edge spaced from the plane of the partition member and overhanging the terminal edge of the partition member, the angularity of the overflow limit lip to the main wall being substantially less than a right angle.

9. The combination with a container having a side wall, a pair of opposed walls meeting the side wall, and a top wall, of a measuring and dispensing device comprising a main wall inclined relative to the container side wall, said main wall having a substantially straight upper edge all points of which are spaced substantially equidistant from the top wall of the container, and a lower edge on the main wall abutting the container side wall, a partition member inclined toward an intermediate portion of the main wall and having a terminal edge substantially uniformly spaced from said portion of the main wall, an overflow limit lip in the form of a wall substantially coextensive in width with the upper edge of the main wall and extending from said upper edge toward the partition member, said overflow limit lip having a free terminal edge spaced from the plane of the partition member and included in a plane meeting the plane of the main wall at an angle substantially less than a right angle.

10. The combination with a container having a side wall, a pair of opposed walls meeting the side wall, and a top wall, meeting along a line of juncture adjacent to which a pouring opening is provided, of a measuring and dispensing device comprising a main wall inclined relative to the container side wall, said main wall having a substantially straight upper edge all points of which are spaced substantially equidistant from the top wall of the container, and a lower edge on the main wall abutting the container side wall, a partition member inclined substantially at right angles to an intermediate portion of the main wall to provide a gradually restricted passage toward the pouring opening and having a terminal edge substantially uniformly spaced from said portion of the main wall, to provide an upper and lower chamber, the upper chamber being supplied with material from the container when the container is tilted, and the lower chamber being supplied with material from the upper chamber when the container is subsequently righted.

11. A measuring and dispensing device adapted for application to a container at the apex formed by the top and two intersecting vertical walls of the container, and comprising a substantially triangular main wall inclined downwardly from a line spaced from the top, toward each vertical container wall, and a partition member of substantially triangular formation inclined at an angle to the container top and downwardly from a location adjacent to said apex included by said container top and walls, and having a terminal edge spaced from substantially the mid-portion of the main wall a distance approximating the spacing between the container top and the top of the main wall, to provide an upper chamber in communication with the container interior and a lower chamber communicating with the upper chamber along the aforesaid terminal edge, said lower chamber having a pouring aperture communicating with the atmosphere exteriorly of the container, to which aperture the inclined partition member provides a funnel shaped passage.

12. A measuring and dispensing device for application to a container, said device comprising an inclined main wall and a partition member inclined to the main wall and having a terminal edge substantially uniformly spaced from the main wall, an upper edge on the main wall, and an overflow limit lip in the form of a wall coextensive in width with the upper edge of the main wall and extended toward the partition member, said overflow limit lip having a free terminal edge spaced from the plane of the partition member and included in a plane meeting the plane of the main wall at an angle substantially less than a right angle, and means operable exteriorly of the container for selectively closing the space between the main wall and the terminal edge of the partition member.

13. The combination with a container having a vertical wall, a closure flap hinged at the top of said wall to be turned inwardly, and means including an intermediate glue flap closing the top of the container, of a measuring and dispensing device in the container comprising an upper and a lower chamber normally in communication with one another, the closure flap of said vertical container wall being extended from the hinge inwardly and downwardly into one of the chambers to close off communication between the chambers.

14. The combination with a container having a vertical wall, a closure flap hinged at the top of said wall to be turned inwardly, and an intermediate glue flap for closing the top of the container, of a measuring and dispensing device in the container comprising an upper and a lower chamber normally in communication with one another, the closure flap of said vertical container wall being extended normally inwardly and downwardly into one of the chambers to close off communication between the chambers, and a cover leaf on the measuring and dispensing device providing a substitute for the closure flap of the container, for attachment to the intermediate glue flap.

GEORGE C. CONN.